(12) United States Patent
Murakami

(10) Patent No.: US 8,604,769 B2
(45) Date of Patent: Dec. 10, 2013

(54) SWITCHING POWER SOURCE DEVICE

(75) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 295 days.

(21) Appl. No.: 13/116,226

(22) Filed: May 26, 2011

(65) Prior Publication Data

US 2011/0291626 A1    Dec. 1, 2011

(30) Foreign Application Priority Data

May 28, 2010   (JP) .................................. 2010-122270
Apr. 1, 2011    (JP) .................................. 2011-081485

(51) Int. Cl.
    *G05F 1/575*       (2006.01)
(52) U.S. Cl.
    USPC ......................................................... 323/284
(58) Field of Classification Search
    USPC ......................................................... 323/284
    See application file for complete search history.

(56) References Cited

U.S. PATENT DOCUMENTS

| 6,369,555 B2 * | 4/2002 | Rincon-Mora | 323/282 |
| 6,583,610 B2 * | 6/2003 | Groom et al. | 323/288 |
| 2010/0123446 A1 * | 5/2010 | Cheng et al. | 323/288 |

FOREIGN PATENT DOCUMENTS

JP    2010-035316    2/2010

* cited by examiner

*Primary Examiner* — Harry Behm
(74) *Attorney, Agent, or Firm* — Fish & Richardson P.C.

(57) ABSTRACT

A switching power source device disclosed in this specification includes a switching power source portion of nonlinear control method to generate an output voltage from an input voltage by performing an ON/OFF control of a switch element according to a comparison result between a feedback voltage and a reference voltage, wherein a ripple component is injected to either one of the feedback voltage and the reference voltage, and an offset control portion to adjust either one of the feedback voltage and the reference voltage for cancelling a DC offset of the output voltage caused by the ripple component.

6 Claims, 12 Drawing Sheets

SWITCHING POWER SOURCE DEVICE

CROSS-REFERENCE TO RELATED APPLICATIONS

This application claims the benefit of priority of Japanese patent application No. 2010-122270 (filing date: May 5, 2010) and No. 2011-081485 (filing date: Apr. 1, 2011), which are incorporated herein by reference in their entirety.

BACKGROUND OF THE INVENTION

1. Field of the Invention

This disclosure relates to a switching power source device of nonlinear control method.

2. Description of Related Art

Each of figures FIGS. 12A to 12C illustrates a circuit block diagram and an operation waveform diagram illustrating a switching power source device adopting a nonlinear control method in accordance with conventional examples. FIG. 12A illustrates a hysteresis window method, FIG. 12B illustrates a fixed ON-time with bottom detection method, and FIG. 12C illustrates a fixed OFF-time with upper detection method, respectively. In addition, each of the switching power source devices illustrated in FIGS. 12A to FIG. 12C is a step-down DC/DC converter to generate a desired output voltage OUT by stepping down an input voltage IN.

Compared to a switching power source device of a linear control method (e.g., a voltage mode control method or a current mode control method), the switching power source device of a nonlinear control method has a advantage that a high load transient response can be obtained with a simple circuit construction.

On the other hand, a switching power source device of a nonlinear control method drives a comparator by utilizing an output ripple voltage (i.e., the ripple component of the output voltage OUT), and then a switching control of an output transistor is performed. Therefore, based on the construction described above, an output ripple voltage with a large amplitude (i.e., peak value) to some extent is required to detect the output ripple voltage correctly. Therefore, using of a capacitor having a relatively large ESR [Equivalent Series Resistance] (e.g., a conductive polymer type) cannot be avoided, which limits selection of a part or increases cost.

Furthermore, a known technique to drive a comparator in a stable manner based on a forcible injection of a ripple component to the reference voltage Vref provided to a comparator (i.e., a ripple injection technique, in other words, a ripple is combined with other voltages) is proposed. If adopting this ripple injection technique, even in if an amplitude of the output ripple voltage is not so large, stable switching control can be performed, and a multilayer ceramic capacitor with small ESR can be used as an output capacitor.

In addition, as a conventional technique related to the aforementioned technique, Japanese patent publication No. 2010-35316 can be listed.

However, a DC value of the reference voltage Vref to which a ripple component is injected fluctuates according to a duty of a switch voltage Vsw (i.e., a pulse voltage generated at one end of the output transistor) used for a generation of the ripple component. Especially, as the amount of the ripple injection (i.e., an amplitude of the ripple component injected to the reference voltage Vref) is increased, the more the DC value of the reference voltage Vref to which the ripple component is injected fluctuates.

Therefore, in the conventional switching power source device, there is a problem that an output voltage accuracy or a load regulation characteristic (i.e., a stability of the output voltage OUT against a load fluctuation) can be worsened as a trade off, contrary to an increase of an amount of ripple injection for enhancing the stability or jitter characteristic of the switching operation.

SUMMARY OF THE INVENTION

In view of the aforementioned problem identified by an inventor of this application, the disclosure discloses a switching power source device with a stable switching operation and an enhancement of a jitter characteristic based on an increase of an amount of the ripple injection, without worsening an accuracy of the output voltage or an load regulation characteristic of the output voltage.

In some implementations, a switching power source device disclosed in this specification includes a switching power source portion of a nonlinear control method to generate an output voltage from an input voltage by performing an ON/OFF control of a switch element according to a comparison result between a feedback voltage and a reference voltage, wherein a ripple component is injected to either one of the feedback voltage and the reference voltage, and an offset control portion to adjust either one of the feedback voltage and the reference voltage for cancelling a DC offset of the output voltage caused by the ripple component.

According to the switching power source device disclosed in the specification, which can increase an amount of the ripple injection without worsening the output voltage accuracy or the load regulation characteristic. Therefore a stable switching operation and an enhancement of a jitter characteristic can be achieved.

Other features of the disclosure, elements, steps, advantages, and characteristics will be apparent from the following description and the drawings and the claims.

DETAILED DESCRIPTION OF PREFERRED EMBODIMENTS (A First Implementation)

Figure 1:
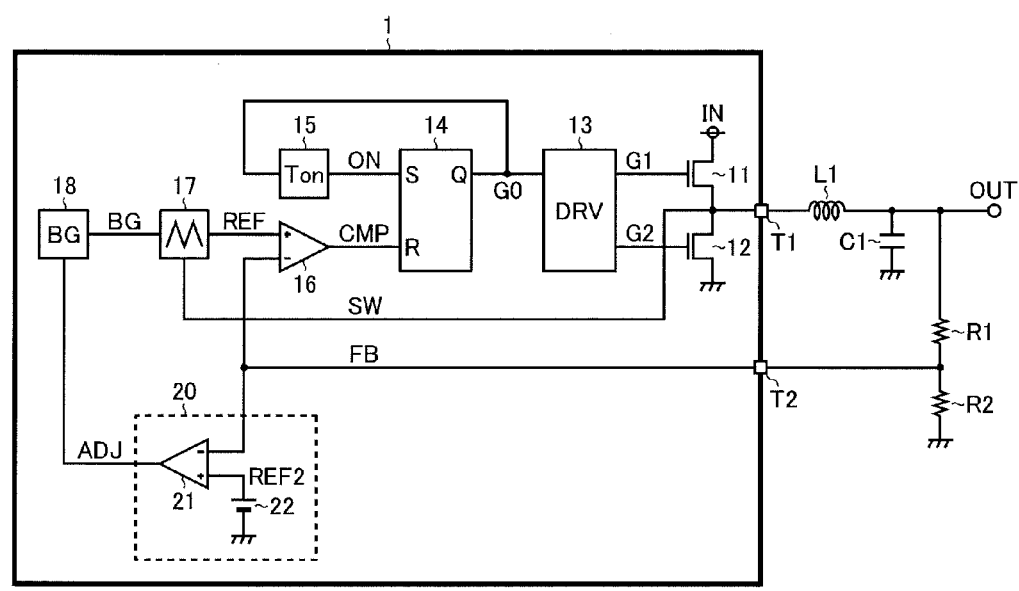
FIG. 1 is a circuit block diagram illustrating a first implementation of a switching power source device in accordance with the invention.

FIG. 1 is a circuit block diagram illustrating a first implementation of the switching power source device in accordance with the disclosure. The switching power source device of this implementation is a step-down DC/DC converter which generates an output voltage OUT from an input voltage IN based on the nonlinear control method. The switching power source device includes a semiconductor device 1 and externally provided parts of an inductor L1, a capacitor C1, and resistors R1 and R2.

A first terminal of the inductor L1 is connected to an external terminal T1 (i.e., a switch terminal) of the semiconductor device 1 outside the semiconductor device 1. A second terminal of the inductor L1, a first terminal of the capacitor C1, and a first terminal of the resistor R1 are connected to an output terminal of the output voltage OUT respectively. A second terminal of the capacitor C1 is connected to a ground terminal. A second terminal of the resistor R1 and a first terminal of the resistor R2 are connected to an external terminal T2 (i.e., a feedback terminal) of the semiconductor device 1 respectively. A second terminal of the resistor R2 is connected to the ground terminal.

The semiconductor device 1 is a switching power source IC which integrated NMOS FETs 11 and 12, a driver 13, a SR flip-flop 14, an ON-time setting portion 15, a comparator 16, a ripple injection portion 17, a bandgap power source portion 18, and an offset adjustment portion 20.

The transistor 11 is an output transistor connected between an input terminal of the input voltage IN and the external terminal T1. The transistor 11 is controlled to turn ON/OFF according to a gate signal G1 provided from the driver 13. With respect to a connection relationship concretely, a drain of the transistor 11 is connected to an input terminal of the input voltage IN. A source of the transistor 11 is connected to the external terminal T1. A gate of the transistor 11 is connected to an input terminal of the gate signal G1.

The transistor 12 is a synchronous rectifier transistor connected between the external terminal T1 and the ground terminal, and controlled to turn ON/OFF according to a gate signal G2 provided from the driver 13. Referring to a connection relationship concretely, a drain of the transistor 12 is connected to the external terminal T1. A source of the transistor 12 is connected to the ground terminal. A gate of the transistor 12 is connected to an input terminal of the gate signal G2. In addition, a diode can be used as a rectifier element on behalf of the transistor 12.

The driver 13 generates gate signals G1 and G2 according to an output signal G0 from the SR flip-flop 14, and performs switching control for the transistor 11 and 12 complementary (i.e., exclusively). In addition, the word "complementary (i.e., exclusively)" in this specification includes not only a case in which ON/OFF states are completely reversed for the transistors 11 and 12, but also a case in which predetermined delay is added to ON/OFF transition timing for the transistors 11 and 12 (i.e., in case of a simultaneous OFF period is set up), in terms of preventing a through current.

Figure 3:
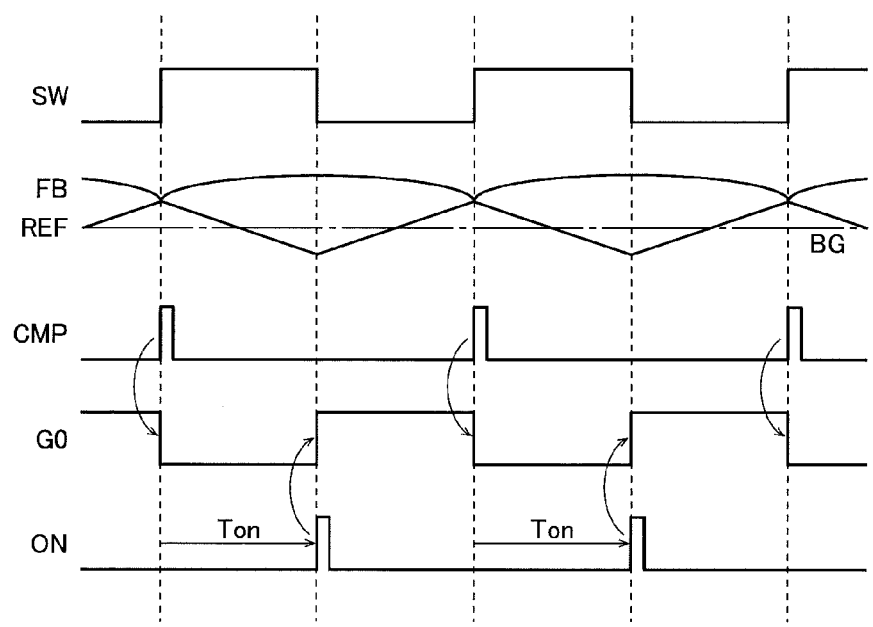
FIG. 3 is a timing chart illustrating an example of a switching operation.

The SR flip-flop 14 sets the output signal G0 at a high level according to a rising edge of the ON-time setting signal ON provided to a set terminal(S), and resets the output signal G0 at a low level according to a rising edge of a comparison signal CMP provided to a reset terminal (R) (in reference to third to fifth charts in FIG. 3).

The ON-time setting portion 15 generates a trigger pulse of a high level for the ON-time setting signal ON after the output signal G0 from the SR flip-flop 14 is lowered at a low level and after a lapse of a predetermined ON-time Ton (in reference to fourth and fifth charts in FIG. 3).

In addition, the driver 13, the SR flip-flop 14, and the ON-time setting portion 15 functions as a switching controller for performing the ON/OFF control of the transistors 11 and 12 according to the comparison signal CMP provided from the comparator 16.

The comparator 16 compares a feedback signal FB (i.e., a divided voltage of the output voltage OUT) provided to an inverting terminal (−) from the external terminal T2 (i.e., a connection node between the resistor R1 and the resistor R2) with the ripple injected reference voltage REF provided to the non-inverting input terminal (+) from the ripple injection portion 17, and then outputs the comparison signal CMP. In other words, if the feedback voltage FB is higher than the ripple injected reference voltage REF, the comparison signal CMP becomes a low level. On the other hand, if the feedback voltage FB is lower than the ripple injected reference voltage REF, the comparison signal CMP becomes a high level (in reference to the second and third charts in FIG. 3).

The ripple injection portion 17 generates the ripple component by utilizing the switch voltage SW generated at the external terminal T1 (i.e., a connection node between the transistor 11 and the transistor 12), and injects the ripple component to the band gap reference voltage BG (in reference to the first and second charts in FIG. 3).

Figure 2:
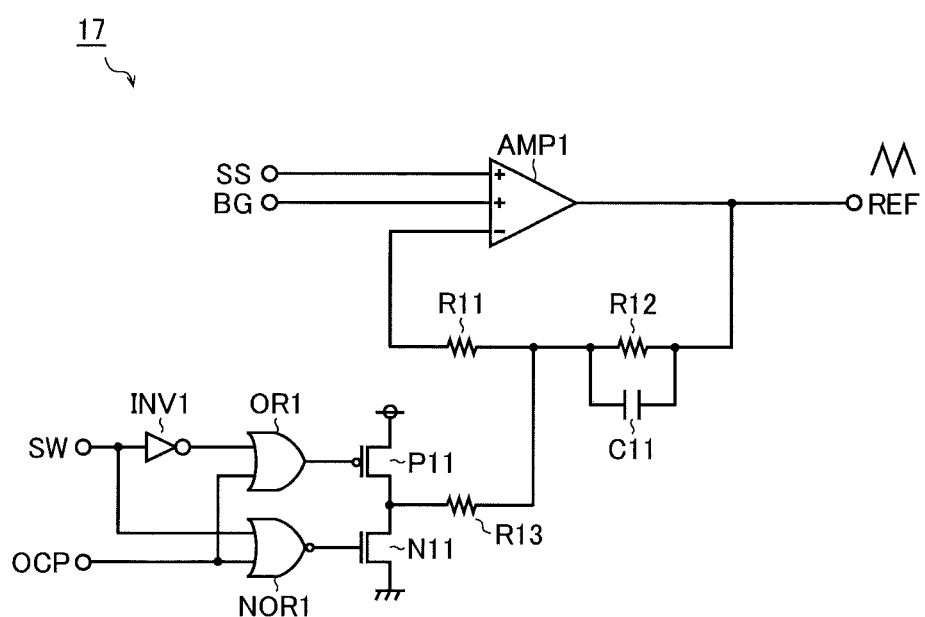
FIG. 2 is a circuit block diagram illustrating a construction example of a ripple injection portion 17.

FIG. 2 is a circuit block diagram illustrating a construction example of the ripple injection portion 17. As illustrated in FIG. 2, the ripple injection part 17 of this construction example includes an amplifier AMP1, resistors R11 to R13, a capacitor C11, a PMOS FET P11, a NMOS FET N11, an inverter INV1, a logical sum operator OR1, and a non-logical sum operator NOR1.

A second non-inverting input terminal (+) of the amplifier AMP1 is connected to an input terminal of a soft start voltage SS. The soft start voltage SS is a slope voltage which rises to a predetermined target value (i.e., a voltage value higher than the band gap reference voltage BG) slowly from 0V after start-up of the semiconductor device 1. A first non-inverting terminal (+) of the amplifier AMP1 is connected to an input terminal of the band gap reference voltage BG. An inverting terminal (−) of the amplifier AMP1 is connected to a first terminal of the resistor R11. An output terminal of the amplifier AMP1 is connected to an output terminal of the ripple component injected reference voltage REF. A second terminal of the resistor R11 is connected to a first terminal of the resistor R12, a first terminal of the resistor R13, and a first terminal of the capacitor C11 respectively. Both of a second terminal of the resistor R12 and a second terminal of the capacitor C11 are connected to an output terminal of the amplifier AMP1. A second terminal of the resistor R13 is connected to a drain of the transistor P11 and a drain of the transistor N11 respectively. A source of the transistor P11 is connected to a power source terminal. A source of the transistor N11 is connected to the ground terminal. A gate of the transistor P11 is connected to an output terminal of the logical sum operator OR1. A gate of the transistor N11 is connected to an output terminal of the non-logical sum operator NOR1. A first input terminal of the logical sum operator OR1 is connected to an output terminal of the inverter INV1. Both an input terminal of the inverter INV1 and a first input terminal of the non-logical sum operator NOR1 are connected to an input terminal of the switch voltage SW. Both a second input terminal of the logical operational sum operator OR1 and the second input terminal of the non-logical sum operator NOR1 are connected to an input terminal of the over current protection signal OCP. The over current protection signal OCP is an abnormal protection signal which becomes a high level when a current flowing through the transistors 11 and 12 or the inductor L1 become an over current state.

With reference to the ripple injection portion 17 of the aforementioned construction, the resistor R11 to R13, the capacitor C11, the transistor P11 and N11, the inverter INV1, the logical sum operator OR1, and the non-logical sum operator NOR1 function as a pulse driver to drive a negative feedback loop of the amplifier AMP1 by a pulse according to the switch voltage SW. As a result of this construction, the reference voltage REF provided from the amplifier AMP1 becomes a "voltage value fluctuating wave form" based on the band gap reference voltage BG. In other words, the reference voltage REF becomes a wave form that represents the band gap reference voltage BG injected with the ripple component (in reference to the second chart in FIG. 3). However, after start-up of the semiconductor device 1, during a soft start period of the soft start voltage SS is lower than the band gap reference voltage BG, the reference voltage REF is generated by injecting a ripple component to the slowly rising soft start voltage SS.

In reference to FIG. 1 again, a description of the circuit block integrated in the semiconductor device 1 is resumed below.

The band gap power source portion 18 generates a predetermined band gap reference voltage BG (e.g., 1.2V) which is not dependent on a fluctuation of the power source voltage or a fluctuation of the ambient temperature.

The offset adjustment portion 20 is a circuit block which generates an offset adjustment signal ADJ for the band gap power source portion 18 based on the feedback voltage FB, and includes an error amplifier 21 and a DC voltage source 22. The error amplifier 21 amplifies the difference between the feedback voltage FB provided to an inverting input terminal (−) from the output terminal T2 and a predetermined target voltage REF2 provided to a non-inverting input terminal (+) from the DC voltage source 22, then outputs an offset adjustment signal ADJ.

The band gap power source portion 18 adjusts a voltage value of the band gap reference voltage BG based on the offset adjustment signal ADJ provided from the offset adjustment part 20. More specifically, the lower the feedback voltage FB becomes compared to the target voltage REF2 and the higher the voltage value of the offset adjustment signal ADJ becomes, the higher the band gap power source portion 18 sets a voltage value of the band gap reference voltage BG. As a result, a DC value of the ripple component injected reference voltage REF becomes higher, and feedback control is performed to boost the output voltage OUT (i.e., furthermore boost the feedback voltage FB).

Figure 4:
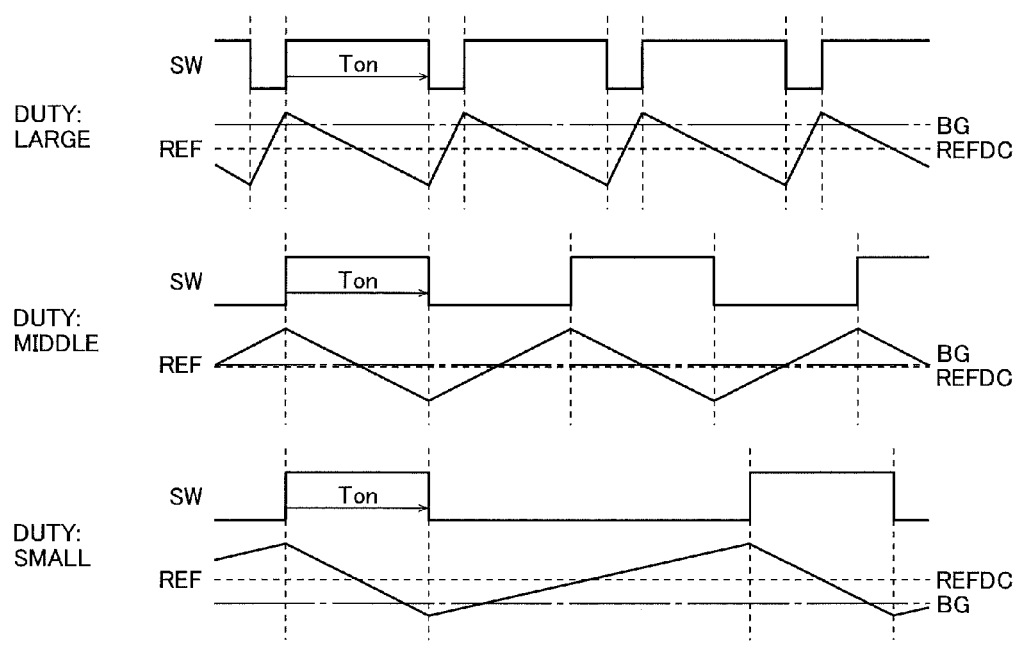
FIG. 4 is a waveform diagram illustrating a SW duty dependency of a reference voltage VREF.

Thus, with reference to the offset adjustment portion 20, the offset adjustment signal ADJ for the band gap voltage portion 18 is generated to equalize the feedback voltage FB with the predetermined target voltage REF2. Therefore, as illustrated in FIG. 4, even if a DC voltage value of the ripple injected reference voltage REF (i.e., REFDC) fluctuates according to a duty of the switch voltage SW and results in an unintentional DC offset is caused to the output voltage OUT (i.e., furthermore to the feedback voltage FB), an automation adjustment for the voltage value of the band gap reference voltage BG can be performed to cancel this DC offset. Thus, the output voltage accuracy or the load regulation characteristic can be improved.

With respect to the conventional technique, for fearing a deterioration of the output voltage accuracy or the load regulation characteristic, an amount of the ripple injection is suppressed. However, adoption of the aforementioned construction can increase an amount of the ripple injection without worsening the output voltage accuracy or the load regulation characteristic. Therefore, a stable switching operation and an enhancement of a jitter characteristic can be achieved.

Figure 5:
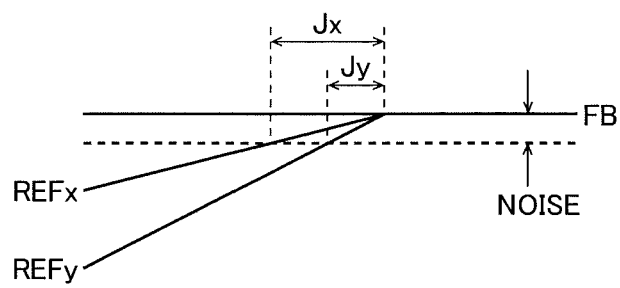
FIG. 5 is a schematic diagram illustrating a relationship between the amount of ripple injection and the amount of jitter.

FIG. 5 is a schematic diagram illustrating a relationship between an amount of the ripple injection and an amount of jitter. A crossed axes angle between the large ripple injected reference voltage REFy with the feedback voltage FB becomes larger (deeper) than a crossed axes angle between the small ripple injected reference voltage REFx with the feedback voltage FB. Therefore, for example, if taking account of the jitter component to the comparison signal CMP caused by a fluctuation of the feedback voltage FB (in reference to a broken line in FIG. 5), a jitter component Jy at the time of inputting the REFy becomes smaller than the jitter component Jx at the time of inputting the REFx. Thus, to improve the jitter characteristic, an increase of an amount of the ripple injection is effective.

(A Second Implementation)

Figure 6:
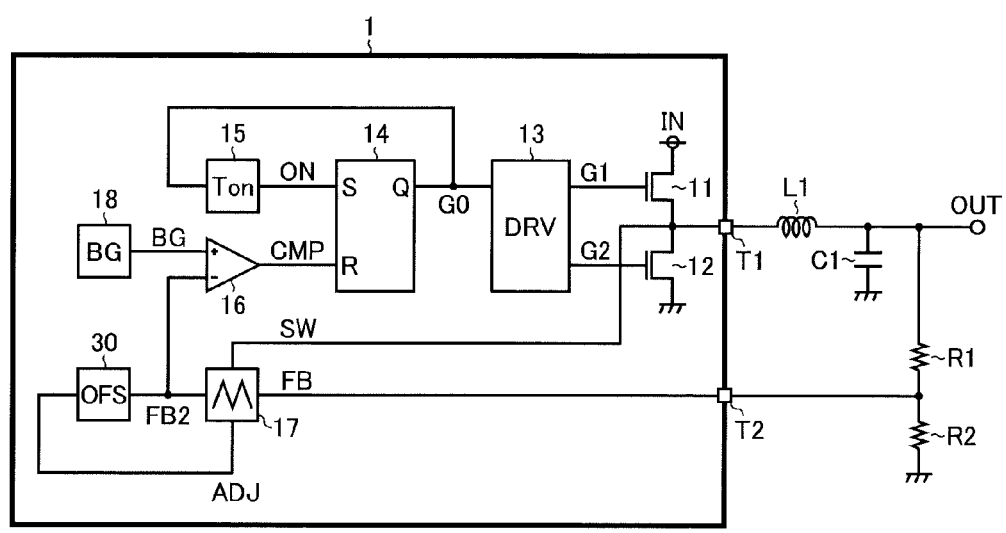
FIG. 6 is a circuit block diagram illustrating a second implementation of the switching power source device in accordance with the invention.

FIG. 6 is a circuit block diagram illustrating a second implementation of the switching power source device in accordance with the disclosure. The second implementation has the same basic construction as the aforementioned first implementation. However, the second implementation has characteristics such that the ripple component is injected to the feedback voltage FB and generates the offset adjustment signal ADJ of the ripple injection portion 17 based on monitoring for the ripple injected feedback voltage FB2. Therefore, with respect to the same components with the first implementation, a redundant explanation is avoided by means of using the same reference numbers as in FIG. 1, and characteristics of the second implementation are explained intensively.

The comparator 16 compares the ripple injected feedback voltage FB2 provided to the inverting input terminal (−) from the ripple injection portion 17 with the band gap reference voltage BG provided to the non-inverting input terminal (+) from the band gap power source portion 18, and outputs the comparison signal CMP. Thus, if the ripple injected feedback voltage FB2 is higher than the band gap reference voltage BG, the comparison signal CMP becomes a low level. On the contrary, if the ripple injected feedback voltage FB2 is lower than the band gap reference voltage BG, the comparison signal CMP becomes a high level.

The ripple injection portion 17 generates the ripple component based on the switching voltage SW and injects it to the feedback voltage FB.

The offset adjustment portion 30 generates the offset adjustment signal FB2DC for the ripple injection portion 17 from the ripple injected feedback voltage FB2. More specifically, the offset adjustment portion 30 includes a CR filter to generate a smoothed feedback voltage FB2DC by smoothing the ripple injected feedback voltage FB2. The offset adjustment portion 30 also includes an error amplifier to generate the offset adjustment signal ADJ for equalizing the smoothed feedback voltage FB2DC with a predetermined target voltage REF3, and outputs the signal to the ripple injection portion 17 (both parts are not illustrated in FIG. 6).

This construction makes it possible to realize the same function and effect as in the aforementioned first implementation.

(A Third Implementation)

Figure 7:
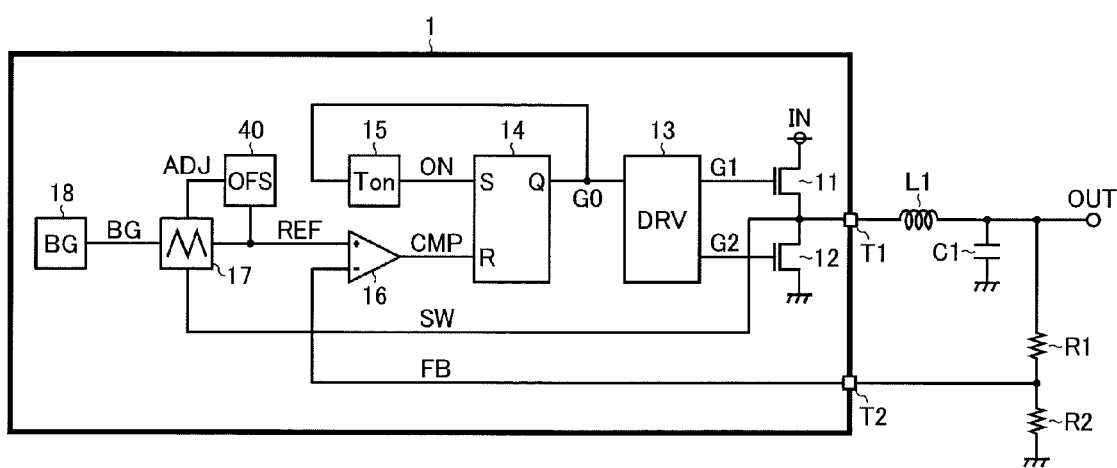
FIG. 7 is a circuit block diagram illustrating a third implementation of the switching power source device in accordance with the invention.

FIG. 7 is a circuit block diagram illustrating a third implementation of the switching power source device in accordance with the disclosure. The third implementation has the same basic construction as the aforementioned first implementation. However, the third implementation has a characteristic of generating the offset adjustment signal ADJ of the ripple injection portion 17 based on monitoring for the ripple injected reference voltage REF. Therefore, with respect to the same components with the first implementation, a redundant explanation is avoided by means of putting the same reference numbers as in FIG. 1, and characteristics of the third implementation are explained intensively.

As describe above, the offset adjustment portion 40 generates the offset adjustment signal ADJ of the ripple injection portion 17 based on the ripple injected reference voltage REF, not based on the feedback voltage FB.

Figure 8:
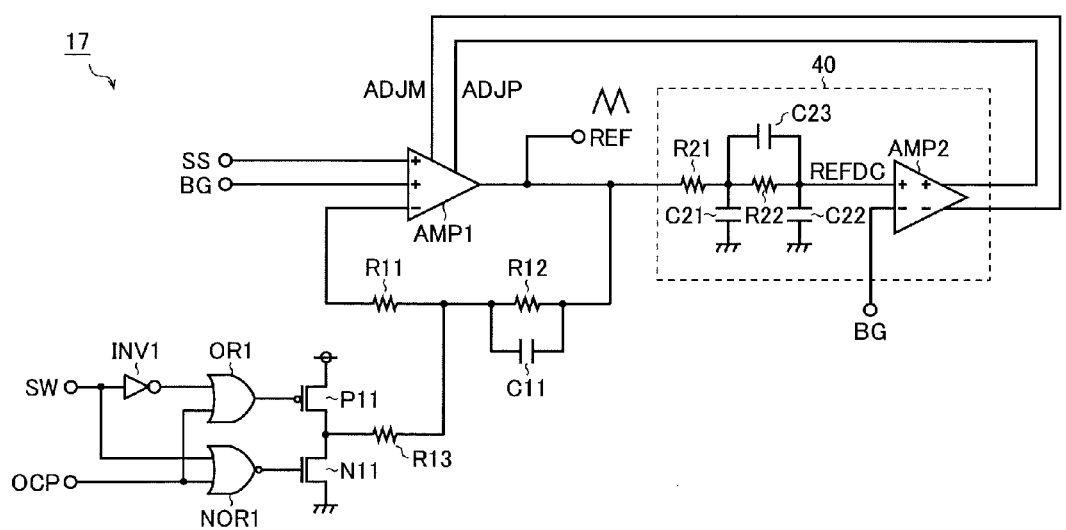
FIG. 8 is a circuit block diagram illustrating an example of an offset adjustment portion 40.

FIG. 8 is a circuit block diagram illustrating a construction example of the offset adjustment portion 40. The offset adjustment portion 40 of this construction example includes the amplifier AMP2, the resistors R21 and 22, and the capacitors C21 to C23.

A first terminal of the resistor R21 is connected to an output terminal of the amplifier AMP1. A second terminal of the resistor R21 is connected to a first terminal of the resistor R22, a first terminal of the capacitor C21, and a first terminal of the capacitor C23. A second terminal of the capacitor C21 is connected to the ground terminal. Each of a second terminal of the resistor R22, a first terminal of the capacitor C22, and a second terminal of the capacitor C23 is connected to a non-inverting input terminal (+) of the amplifier AMP2. An inverting input terminal (−) of the amplifier AMP2 is connected to an input terminal of the band gap reference voltage BG. As an output terminal of the non-inverting offset adjustment signal ADJP, a non-inverting output terminal (+) of the amplifier AMP2 is connected to the amplifier AMP1. As an inverting offset adjustment signal ADJM, an inverting output terminal (−) of the amplifier AMP2 is connected to the amplifier AMP1.

In other words, the offset adjustment portion 40 of this construction example includes a CR filter (i.e., the resistors R21 to R22, and the capacitors C21 to C23) to generate the smoothed reference voltage REFDC by smoothing the ripple injected reference voltage REF, and the amplifier AMP2 to generate the offset adjustment signals ADJP and ADJM for equalizing the band gap reference voltage BG before the ripple injection with smoothed reference voltage REFDC. Then the offset adjustment signals ADJP and ADJM are provided to the amplifier AMP1.

Figure 9:
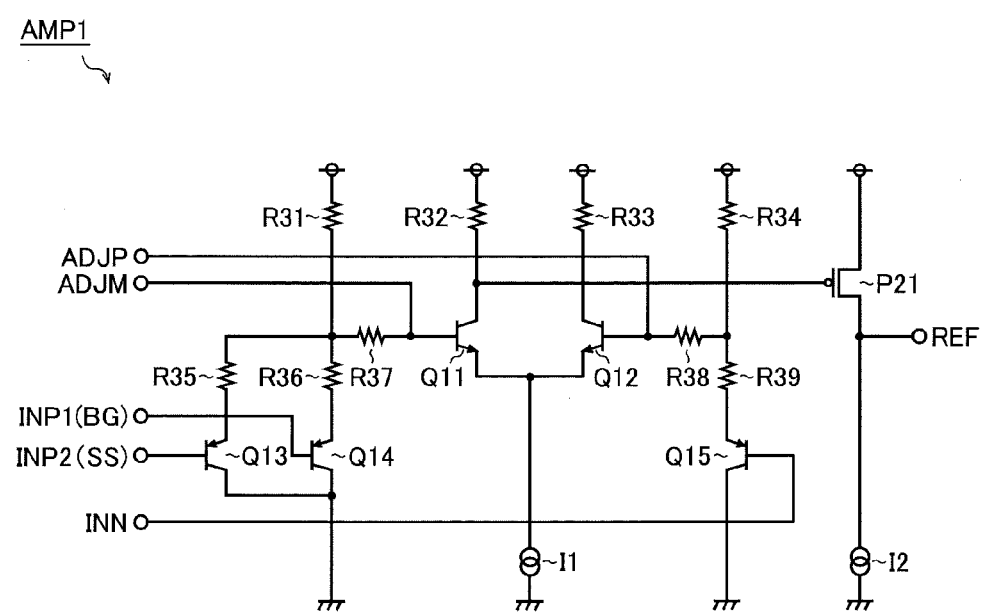
FIG. 9 is a circuit diagram illustrating an example of an amplifier AMP1.

FIG. 9 is a circuit diagram illustrating a construction example of the amplifier AMP1. The amplifier AMP1 of this construction example includes npn bipolar transistors Q11 to Q12, pnp bipolar transistors Q13 to Q15, a PMOS FET P21, resistors R31 to R39, and constant current sources I1 to I2.

Each collector of the transistors Q11 to Q12 is connected to the power source terminal via the resistors R32 and R33. Emitters of the transistors Q11 to Q12 are connected to each other, and the connection node is connected to the ground terminal via the constant current source I1.

A base of the transistor Q11 is connected to a first terminal of the resistor R37 and an input terminal of the inverting offset adjustment signal ADJM respectively. A second terminal of the resistor R37 is connected to the power source terminal via the resistor R31, and also connected to each emitter of the transistors Q13 and Q14 via the resistors R35 and R36. Collectors of the transistors Q13 to Q14 are connected to each other, and the connection node is connected to the ground terminal. A base of the transistor Q13 is equivalent to a second non-inverting input terminal INP2 of the amplifier AMP1, and the base is connected to an input terminal of the soft start voltage SS. A base of the transistor Q14 is equivalent to a first non-inverting input terminal INP1 of the amplifier AMP1, and the base is connected to an input terminal of the band gap reference voltage BG.

A base of the transistor Q12 is connected to a first terminal of the resistor R38 and an input terminal of a non-inverting offset adjustment signal ADJP respectively. A second terminal of the resistor R38 is connected to the ground terminal via the resistor R34, and also connected to an emitter terminal of the transistor Q15 via the resistor R39. A collector of the transistor Q15 is connected to the ground terminal. A base of the transistor Q15 is equivalent to an inverting input terminal INN of the amplifier AMP1.

A source of the transistor P21 is connected to the power source terminal. A drain of the transistor P21 is connected to an output terminal of the ripple injected reference voltage REF, and also connected to a ground terminal via the constant current source 12. A gate of the transistor P21 is connected to a collector of the transistor Q11.

Figure 10:
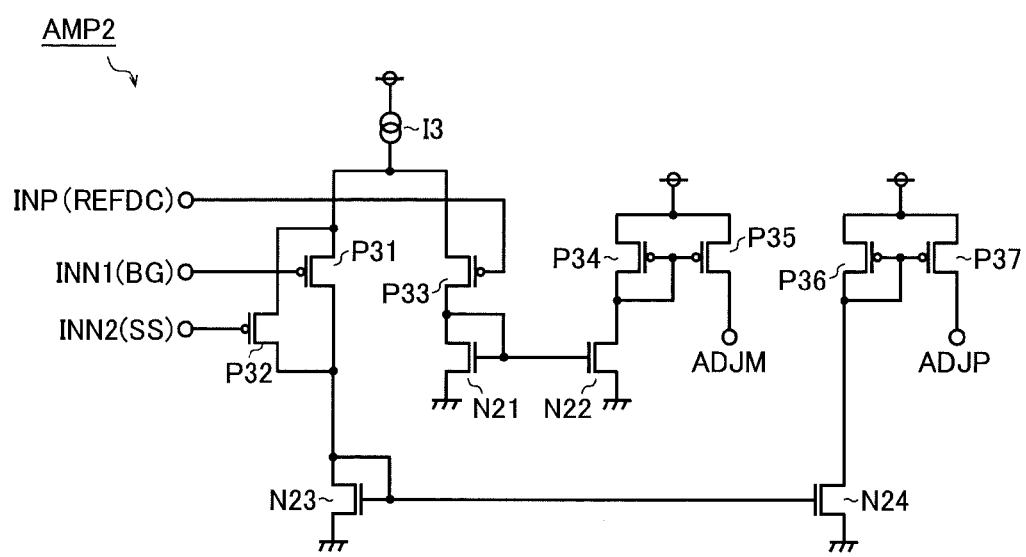
FIG. 10 is a circuit diagram illustrating an example of an amplifier AMP2.

FIG. 10 is a circuit diagram illustrating a construction example of the amplifier AMP2. The amplifier AMP2 of this construction example includes PMOS FETs P31 to P37 and NMOS FETs N21 to N24.

Sources of the transistors P31 to P33 are connected to each other, and the connection node is connected to the power source terminal via the constant current source 13. Drains of the transistor P31 and P32 are connected to each other, and the connection node is connected to a drain of the transistor N23. A drain of the transistor P33 is connected to a drain of the transistor N21. A gate of the transistor P31 is equivalent to a first inverting input terminal INN1 of the amplifier AMP2, and connected to an input terminal of the band gap reference voltage BG. A gate of the transistor P32 is equivalent to a second inverting input terminal INN2 of the amplifier AMP2, and connected to an input terminal of the soft start voltage SS. A gate of the transistor P33 is equivalent to a non-inverting input terminal INP of the amplifier AMP2, and connected to an input terminal of the smoothed reference voltage REFDC.

Each gate of the transistors N21 and N22 is connected to a drain of the transistor N21. Each source of the transistors N21 and N22 is connected to a ground terminal. A drain of the transistor N22 is connected to a drain of the transistor P34. Each gate of the transistors P34 and P35 is connected to a drain of the transistor P34. Each source of the transistors P34 and P35 is connected to a power source terminal. A drain of the transistor P35 is connected to an output terminal of the inverting offset adjustment signal ADJM.

Each gate of the transistors N23 and N24 is connected to a drain of the transistor N23. Each source of the transistors N23 and N24 is connected to the ground terminal. A drain of the transistor N24 is connected to a drain of the transistor P36. Each gate of the transistors P36 and P37 is connected to a drain of the transistor P36. Each source of the transistors P36 and P37 is connected to the power source terminal. A drain of the transistor P37 is connected to an output terminal of the non-inverting offset adjustment signal ADJP.

This construction makes it possible to realize the same function and effect as in the aforementioned first implementation. In addition, with respect to the third implementation of monitoring the ripple injected reference voltage REF, an operation of optimizing the phase characteristic in the offset adjustment loop can be performed easily compared to the first implementation of monitoring the feedback voltage FB.

(A Fourth Implementation)

Figure 11:
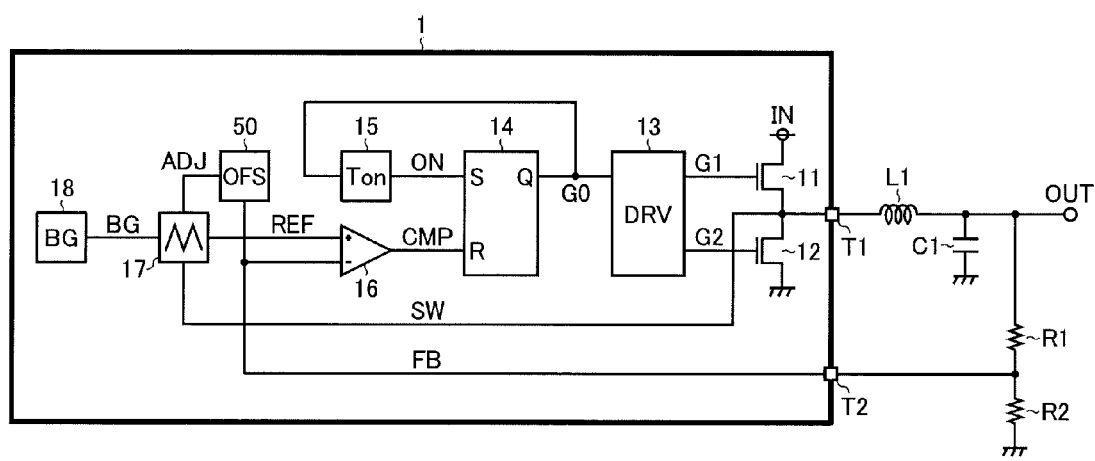
FIG. 11 is a circuit block diagram illustrating a fourth implementation of the switching power source device in accordance with the invention.
Figure 12A:
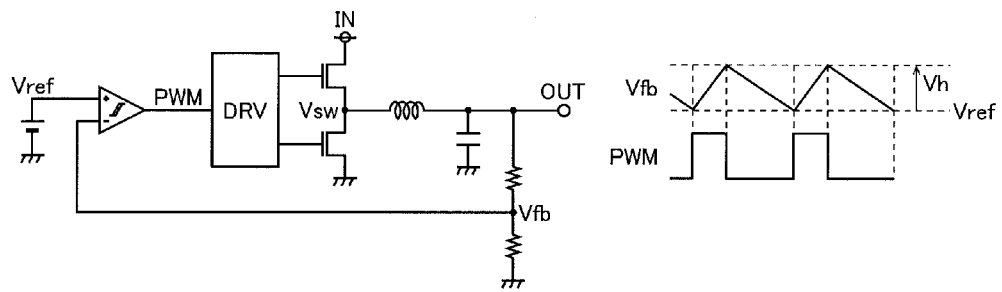
FIG. 12A is a circuit block diagram and an operation waveform diagram illustrating a switching power source device adopting a nonlinear control method in accordance with a first conventional example (i.e., a hysteresis window method).
Figure 12B:
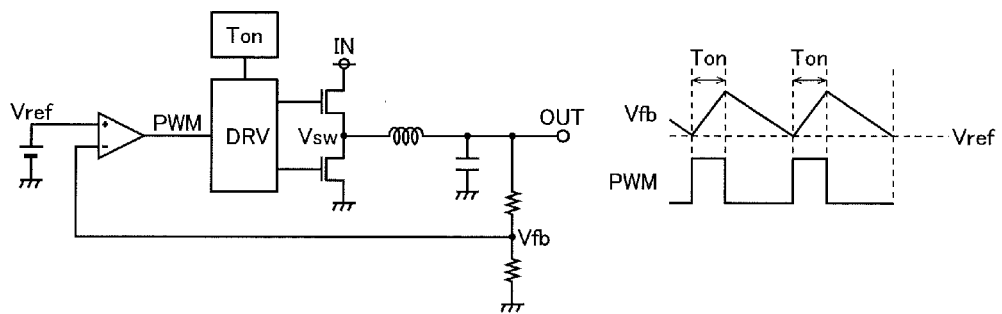
FIG. 12B is a circuit block diagram and an operation waveform diagram illustrating a switching power source device adopting a nonlinear control method in accordance with a second conventional example (i.e., a fixed ON-time with bottom detection method).
Figure 12C:
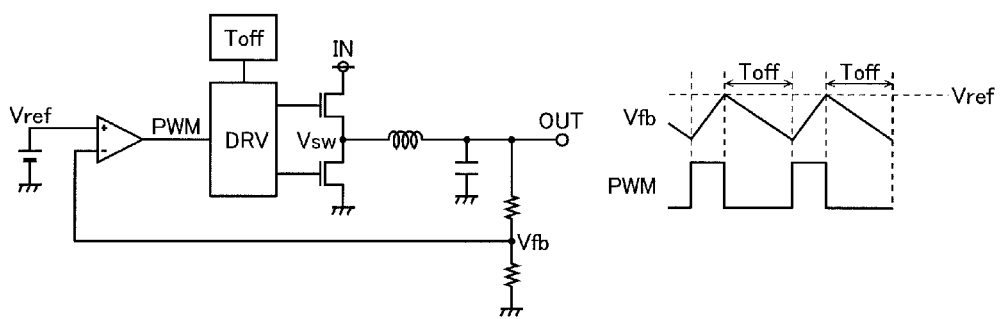
FIG. 12C is a circuit block diagram and an operation waveform diagram illustrating a switching power source device adopting a nonlinear control method in accordance with a third conventional example (i.e., a fixed OFF-time with upper detection method).

FIG. 11 is a circuit block diagram illustrating a fourth implementation of the switching power source device in accordance with the disclosure. The fourth implementation has the same basic construction as in the aforementioned first and third implementations basically. However, the fourth implementation has a characteristic of including the offset adjustment portion 50 to generate an offset adjustment signal ADJ of the ripple injection portion 17 based on the monitoring of the feedback voltage FB. In other words, with respect to monitoring the feedback voltage FB by the offset adjustment portion 50, the fourth implementation is similar to the first implementation. Moreover, with respect to adjusting an offset of the ripple injection portion 17, the fourth implementation is similar to the third implantation.

Furthermore, as for the construction and operation of the ripple injection portion 17 and the amplifier AMP1 included in the ripple injection portion 17, the fourth implementation is similar to the first and third implementation (in reference to FIG. 2, FIG. 8, and FIG. 9). As for the construction and operation of the offset adjustment portion 50, the fourth implementation of which is same as the offset adjustment portion 20 of the first implementation (in reference to FIG. 1).

This construction makes it possible to perform feedback control that reflects a behavior of the output voltage OUT, compared to the third implementation having an offset adjustment loop closed in the semiconductor device 1.

INDUSTRIAL APPLICABILITY

The switching power source device described above can be applied properly to a personal computer, a liquid crystal TV, and a DVD recorder.

(Other Variations)

In addition, with respect to the aforementioned implementations, an example is described as a construction for applying the disclosure to the switching power source device adopting a fixed ON-time with a bottom detection method. However, the applicable object of this disclosure is not restricted to the example, the disclosure can be applied generally to the switching power device adopting a nonlinear control method (e.g., a hysteresis window method or a fixed OFF-time with an upper detection method, and so on).

Thus, with respect to the disclosure, in addition to the aforementioned implementations, various modifications can be made without departing from the spirit and the scope of the disclosure. Therefore, the aforementioned implementations are just examples, and are not considered as restrictive. The technical scope of the disclosure should be determined based on the scope of the claims, not based on an explanation of the aforementioned implementations. It is understood that any variations within the scope of the claims and equivalents should be included to the scope of the technical scope of the disclosure, other implementations are within the scope of the claims.

LIST OF REFERENCE NUMERALS 1 semiconductor device (switching power source IC)
11 NMOS FET (output transistor)
12 NMOS FET (synchronous rectifier transistor)
13 driver
14 SR flip-flop
15 ON-time setting portion
16 comparator
17 ripple injection portion
18 band gap power source portion
20 offset adjustment portion
21 error amplifier
22 DC voltage source
30 offset adjustment portion
40 offset adjustment portion
50 offset adjustment portion
L1 inductor
R1, R2, R11-R13, R21, R22, R31-R39 resistor
C1, C11, C21-C23 capacitor
AMP1, AMP2 amplifier
P11, P21, P31-P37 PMOS FET
N11, N21-N24 NMOS FET
OR1 logical sum operator
NOR1 non-logical sum operator
INV1 inverter
Q11, Q12 npn bipolar transistor
Q13-Q15 pnp bipolar transistor
I1-I3 constant current source

What is claimed is:

1. A switching power source device comprising:
a switching power source portion of a nonlinear control method to generate an output voltage from an input voltage by performing an ON/OFF control of a switch element according to a comparison result between a feedback voltage and a reference voltage, wherein a ripple component is injected to either one of the feedback voltage and the reference voltage; and
an offset control portion to adjust either one of the feedback voltage and the reference voltage for cancelling a DC offset of the output voltage caused by the ripple component,
wherein the switching power source portion comprises:
a reference voltage generator to generate the reference voltage;
a ripple injection portion to generate the ripple component based on a switch voltage generated at one end of the switch element and to inject the ripple component to the reference voltage;
a comparator to compare the feedback voltage with the reference voltage to which the ripple component is injected; and
a switching controller to perform an ON/OFF control of the switch element based on an output signal of the comparator,
and wherein the ripple injection portion comprises:
a first amplifier having a non-inverting input terminal connected to an input terminal of the reference voltage before a ripple injection, and having an inverting input terminal connected to an output terminal of the first amplifier; and
a pulse driver connected between an inverting input terminal of the first amplifier, an output terminal of the first amplifier, and an input terminal of the switch voltage.

2. The switching power source device according to claim 1, wherein the offset adjustment portion generates an offset adjustment signal for the ripple injection portion based on the feedback voltage.

3. The switching power source device according to claim 1, wherein the offset adjustment portion generates an offset adjustment signal for the ripple injection portion based on the ripple injected reference voltage.

4. The switching power source device according to claim 3, wherein the offset adjustment portion comprises:
- a filter to generate a smoothed reference voltage by smoothing the ripple injected reference voltage; and
- a second amplifier to generate the offset adjustment signal for equalizing the reference voltage before an ripple injection with the smoothed reference voltage, and to output the offset adjustment signal to the first amplifier.

5. The switching power source device according to claim 1, wherein the offset adjust portion generates an offset adjustment signal for the reference voltage generator based on the feedback voltage.

6. The switching power source device according to claim 5, wherein the offset adjustment portion comprises;
- an error amplifier to generate the offset adjustment signal for equalizing the feedback voltage with a predetermined target voltage, and output the offset adjustment signal to the reference voltage generator.

* * * * *